(No Model.) 2 Sheets—Sheet 1.
R. GAIGER.
CHECK PUNCHING MACHINE.
No. 408,658. Patented Aug. 6, 1889.
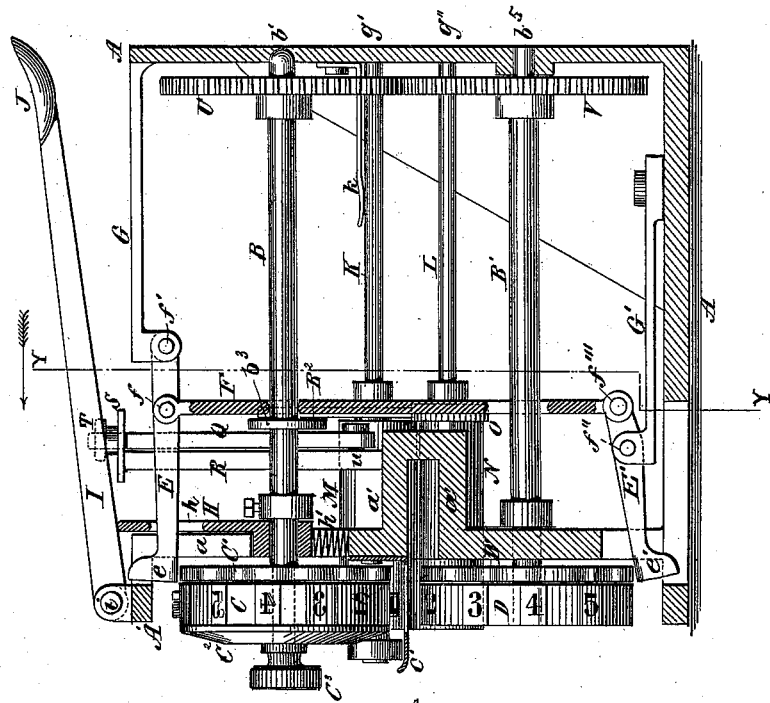
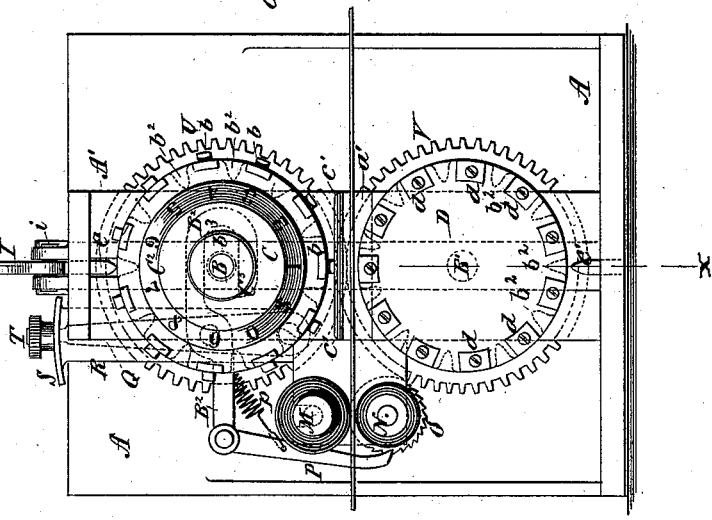
WITNESSES:
INVENTOR
Robert Gaiger
BY
Chas. S. Williams
ATTORNEY (No Model.) 2 Sheets—Sheet 2.
R. GAIGER.
CHECK PUNCHING MACHINE.
No. 408,658. Patented Aug. 6, 1889.
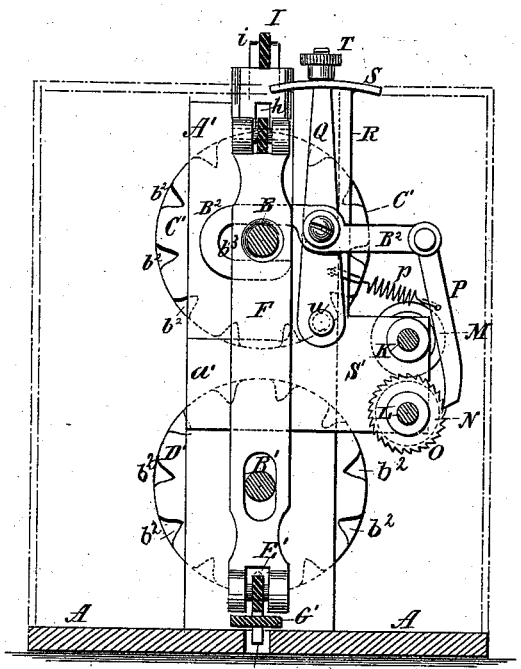
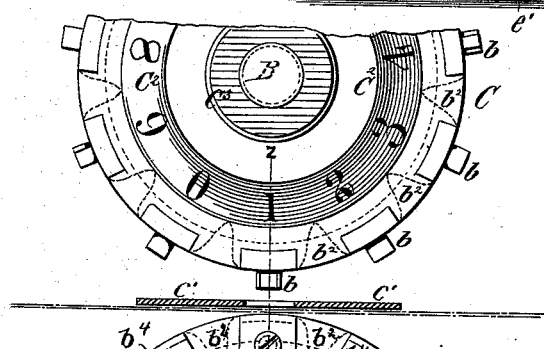
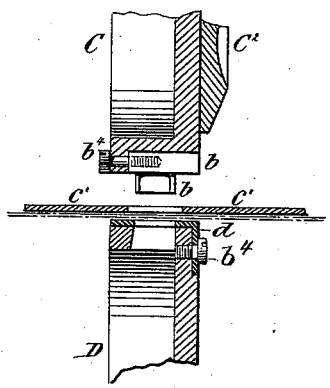
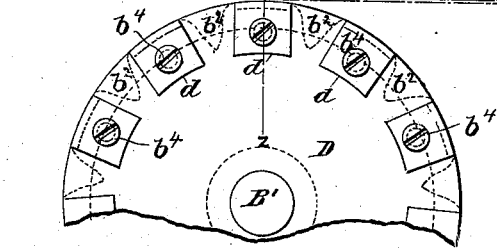
WITNESSES: INVENTOR
Gustave Dieterich Robert Gaiger
James M. Ball BY
Chas. S. Williams
ATTORNEY

UNITED STATES PATENT OFFICE.

ROBERT GAIGER, OF JERSEY CITY, NEW JERSEY.

CHECK-PUNCHING MACHINE.

SPECIFICATION forming part of Letters Patent No. 408,658, dated August 6, 1889.

Application filed July 3, 1888. Serial No. 278,948. (No model.)

*To all whom it may concern:*

Be it known that I, ROBERT GAIGER, a citizen of the United States, residing at Jersey City, in the county of Hudson and State of New Jersey, have invented a new and useful Check-Punching Machine, of which the following is a specification.

My invention relates to an improvement in check-punching machines in which vertical rotary disks having upon their respective peripheries punches and corresponding dies are capable of being so adjusted as to cut the required figures from a bank-check or other paper as it is passed between the disks. I attain this object by the mechanism illustrated in the accompanying drawings, in which—

Figure 1 is a front view of the check-punching machine. Fig. 2 is a longitudinal section of the machine on the line X X, Fig. 1. Fig. 3 is a cross-section on the line Y Y, Fig. 2, showing the feed-rollers M and N. Fig. 4 is a detail view of the disks C and D, and showing in dotted lines the locking-disks C' and D'. Fig. 5 is a sectional view on the line Z Z, Fig. 4, showing the manner of fastening the punches $b\ b$ and dies $d\ d$.

Similar letters refer to similar parts throughout.

My check-punching machine consists of two disks C D, revolving in opposite directions upon and fixed to shafts B B', and each having on its inner side, revolving with it upon the same shaft, a thinner locking-disk C' D'.

Upon the periphery of the disk C is fixed a series of punches $b\ b$, and upon the periphery of the disk D a series of corresponding dies $d\ d$, these punches and dies being held in place by small screws $b^4\ d^3$, Figs. 1, 4, and 5.

The shafts B B' are supported at one end upon the frame A at the points $b'\ b^5$, and at the other end pass through a standard A' $a\ a'$, having suitable collars to hold them in place. The disks C' D' have upon their rims at regular intervals cuttings $b^2\ d'$, into which the ends $e\ e'$ of the locking-arms E E' engage, Fig. 2 and 4. The locking-arm E $e$ is pivoted at the point $f''$, upon a stiff spring G, attached to the frame A, and has a projection $e$, which engages with the cuttings $b^2\ b^2$ in the rim of the disk C', Figs. 1 and 2.

Pivoted at the point $f$ on the arm E is a connecting-rod F, which connects with and is pivoted on the locking-arm E' at the point $f'''$, Figs. 1, 2, and 3. The arm E' is pivoted at the point $f''$ upon a stiff spring G', fixed to the frame A, and engages at the point $e'$ with the cuttings $d'\ d'$ in the rim of the disk D'.

The cuttings $b^2\ b^2$ and $d'\ d'$ are so placed that when the points $e\ e'$ of the locking-arms E E' engage with them they will hold the punches $b\ b$ and dies $d\ d$ firmly in correspondence with each other at the moment the check or other paper is operated upon, Fig. 1.

Pivoted upon the standard A' $a\ a'$ at the point $i$ is a hand-lever I J, the lower edge of which rests upon a sliding bar H. This sliding bar H works vertically in suitable bearings upon the standard A' $a\ a'$ and terminates at its lower extremity in a solid shoe fitting over the shaft B, and rests upon a spiral spring $h'$, set in the standard A' $a\ a'$.

Through H is cut a slot $h$, through which the locking-arm E passes, the slot $h$ being so cut that when the hand-lever I J is pressed down upon H it will carry with it the locking-arm E. The standard A' $a\ a'$ has a rectangular projection $a'\ a'$ to allow for the width of a bank-check or other paper. Fixed to this projection $a'\ a'$ and at right angles to it is a plate S', Fig. 3. Pivoted in the case A at the points $g'\ g''$, and passing through the plate S', are two shafts K and L, upon which revolve, in opposite directions and with their circumferences in contact, two feed-rollers M and N, of rubber or other suitable material, Fig. 3. Fixed to the shaft L and revolving in the same direction as the roller N, but on the opposite side of the plate S', is a ratchet-wheel O. Attached to an upright R, fixed upon the projection $a'\ a'$, is a slotted slide S, in which a regulating-arm Q, pivoted at the point $u$ in the plate S', works.

Pivoted upon the regulating-arm Q and at right angles to it is a hooked lever $B^2\ b^3$, the hook $b^3$ passing over and working horizontally upon the shaft B, Figs. 1, 2, and 3. Pivoted upon the opposite end of the hooked lever $B^2\ b^3$ is a pawl P, which fits the ratchet-wheel O, and is held in place by a small spring $p$ attached to it and to the regulating-arm Q. A thumb-screw T upon the arm Q regulates the length of the horizontal play of the hooked lever $B^2$ $b^3$. Revolving upon the shafts B B' are gear-wheels U and V, Figs. 1 and 2. Upon the outer side of the disk C and revolving with it is an indicating-disk $C^2$, with suitable knob $C^3$. Between the disks C and D is a suitable feed-platform $c'$ $c'$, Figs. 1, 2, 4, and 5.

The operation of my check-punching machine is as follows: The check or other paper is placed upon the feed-platform $c'$ $c'$ between the disks C D and between the rollers M N. The knob $C^3$ of the indicating-disk $C^2$ is turned until the requisite figure on the disk $C^2$ is uppermost. This disk $C^2$ is so adjusted upon the shaft B that when the required figure is up the punch on the periphery of the disk C will be in correspondence with the die on the periphery of the disk D, the disks C and D being brought into position by the turning of the gear-wheels U V when the knob $C^3$ of the indicating-disk $C^2$ is turned. The hand-lever I J is pressed down upon the slide H, which in turn carries the shaft B down upon the spring $h'$, as well as the disk C down upon the disk D, bringing the punches $b$ $b$ and dies $d$ $d$ into position for cutting. The locking-arm E is likewise pressed down by the action of slide H until the point $e$ engages in the cutting $b^2$ in the disk C', and through the downward action of the connecting-rod F the point $e'$ of the locking-arm E' is forced upward and engages with the cutting $d'$ in the disk D', the two disks C and D thus being held firmly in position while the punching is done. When the pressure is taken from the hand-lever I J, the upward action of the spring $h'$ causes the mechanism to return to its normal position.

The check or other paper is carried between the feed-rollers as follows: The downward pressure of the hand-lever I J through the action of the slide H carries with it the shaft B. This draws horizontally and downward the hooked lever $B^2$ $b^3$, which in turn lifts the pawl P from the ratchet O. When the pressure is removed from the hand-lever I J, the rebound of the spring $h'$, Fig. 2, carries upward the shaft B, and with it the hooked lever $B^2$ $b^3$, which forces the pawl P downward upon the ratchet O. The pawl is pressed against the cogs of the ratchet by the spring $p$, and through the action of this downward force causes the ratchet to turn and with it the feed-rollers M N. The check being caught between the two rollers M N, is carried along horizontally the distance required for the next cutting, this distance being regulated at will by the thumb-screw T, Figs. 1, 2, and 3. Upon the shaft K, fixed to the case A, is a small tension-spring $k$ to regulate the pressure of the roller M upon the roller N.

Having fully described my invention, what I desire to claim and secure by Letters Patent is—

1. A check-punching machine consisting of vertical rotary disks C D, arranged upon shafts B B' in a frame A, and standard A' $a$ $a'$, said disks C D having punches $b$ $b$ and dies $d$ $d$ upon their respective peripheries, and being adapted to be brought into contact at their said peripheries, so that when in contact a punch of the one disk will be in cutting correspondence with a die of the other disk, a mechanism having suitable lever, and indicating-disk, slotted slide, and shoe H $h$, spring $h'$, locking-disks C' D' revolving upon the same shafts as the disks C D, locking-arms E $e$ E' $e'$, and connecting-rod F for bringing and holding said disks C D in contact at their peripheries in position for punching, and a feed device in connection with the shaft B, having rollers M N, ratchet O, regulating-arm Q, slotted slide S, hooked lever $B^2$ $b^3$, pawl P, and spring $p$, all substantially as described.

2. In a check-punching machine with suitable supporting-frame and shafts, hand-lever, and indicating-disk, the combination of vertical rotary disks C D, having punches $b$ $b$ and corresponding dies $d$ $d$ upon their respective peripheries, locking-disks C' D', having cuttings $b^2 d'$, and revolving with the same shafts as the disks C D, together with a slotted slide and shoe H, a spring $h'$, a locking-arm E $e$, pivoted upon a stiff spring G, a connecting-rod F, and a locking-arm E' $e'$, pivoted upon a stiff spring G', all substantially as set forth.

3. In a check-punching machine, substantially as described, the combination, with the shaft B, of feed-rollers M N, a ratchet O, a regulating-arm Q, a slotted slide S, a hooked lever $B^2$ $b^3$, a pawl P, and a spring $p$, all substantially as set forth.

ROBT. GAIGER.

Witnesses:
JAMES M. BALL,
JOHN FUREY.